(12) United States Patent
Ou (10) Patent No.: US 11,732,911 B2
(45) Date of Patent: Aug. 22, 2023

(54) OVERHEAD TYPE UPPER WATER ADDING HUMIDIFIER

(71) Applicant: Foshan Shunde Ultek electric appliance Co., ltd, Foshan (CN)

(72) Inventor: Mark Ou, Foshan (CN)

(73) Assignee: FOSHAN SHUNDE ULTEK ELECTRIC APPLIANCE CO., LTD, Foshan (CN)

( * ) Notice: Subject to any disclaimer, the term of this patent is extended or adjusted under 35 U.S.C. 154(b) by 186 days.

(21) Appl. No.: 17/113,160

(22) Filed: Dec. 7, 2020

(65) Prior Publication Data

US 2021/0172625 A1 Jun. 10, 2021

(30) Foreign Application Priority Data

Dec. 9, 2019 (CN) .......................... 201911250435.0

(51) Int. Cl.
*F24F 6/12* (2006.01)
*F21V 33/00* (2006.01)
*C02F 1/32* (2023.01)
*F24F 6/00* (2006.01)

(52) U.S. Cl.
CPC ............ *F24F 6/12* (2013.01); *F21V 33/0064* (2013.01); *C02F 1/325* (2013.01); *F24F 2006/008* (2013.01)

(58) Field of Classification Search
CPC .......... F24F 6/12; F24F 2006/008; F24F 8/22; F24F 11/0008; F24F 11/88; F24F 11/89; F24F 13/00; F21V 33/0064; C02F 1/325; F21Y 2115/10
See application file for complete search history.

(56) References Cited

U.S. PATENT DOCUMENTS

| 1,894,864 | A | * | 1/1933 | Hall | .......................... | F24F 6/06 |
| | | | | | | 96/282 |
| 2,059,408 | A | * | 11/1936 | Stark | ......................... | F24F 6/12 |
| | | | | | | 261/153 |
| 2,361,643 | A | * | 10/1944 | Mueller | .................... | F24D 5/00 |
| | | | | | | 122/DIG. 1 |

(Continued)

FOREIGN PATENT DOCUMENTS

| CN | 101957039 A | | 1/2011 |
| CN | 206222587 | * | 6/2017 |

(Continued)

OTHER PUBLICATIONS

EPO translation of CN 206222587 (Year: 2017).*
EPO translation of CN 109737539 (Year: 2019).*
Epo translation of CN109386924 (Year: 2019).*

*Primary Examiner* — Stephen Hobson
(74) *Attorney, Agent, or Firm* — WPAT, PC (57) ABSTRACT

The present invention discloses an overhead type upper water adding humidifier, which nests the atomization cavity in a water tank, and the water contained in the two is relatively separated and independent, and the two can communicate with each other through the control valve of the water level adjustment component, so that the humidifier is in When working, a constant water level depth can be maintained above the atomizing film, so that the atomizing film is always in the best working state, achieving maximum atomization efficiency and avoiding energy waste.

20 Claims, 6 Drawing Sheets

(56) References Cited

U.S. PATENT DOCUMENTS

| | | | | |
|---|---|---|---|---|
| 4,054,122 | A * | 10/1977 | Reed | F24H 9/0052 |
| | | | | 392/402 |
| 4,256,081 | A * | 3/1981 | Stover | F24B 7/00 |
| | | | | 126/110 R |
| 4,257,389 | A * | 3/1981 | Texidor | F24F 3/14 |
| | | | | 261/DIG. 46 |
| 4,294,223 | A * | 10/1981 | Montague | F23L 11/02 |
| | | | | 126/293 |
| 4,932,464 | A * | 6/1990 | Lee | F23L 15/00 |
| | | | | 122/DIG. 2 |
| 5,143,655 | A * | 9/1992 | Chiu | F24F 6/043 |
| | | | | 261/24 |
| 5,816,496 | A * | 10/1998 | Kovacs | F24F 6/18 |
| | | | | 126/350.2 |
| 6,397,788 | B2 * | 6/2002 | Besik | F22B 13/023 |
| | | | | 122/491 |
| 6,592,107 | B1 * | 7/2003 | Wong | F24F 6/02 |
| | | | | 392/404 |
| 7,832,364 | B2 * | 11/2010 | Liu | C01B 3/382 |
| | | | | 122/18.1 |
| 9,513,003 | B2 * | 12/2016 | Watanabe | F23N 5/022 |
| 9,587,828 | B2 * | 3/2017 | El Zahab | F23J 15/06 |
| 2006/0249099 | A1 * | 11/2006 | Besik | F22B 1/18 |
| | | | | 122/18.1 |
| 2007/0176306 | A1 * | 8/2007 | Huang | F24F 6/00 |
| | | | | 261/DIG. 65 |
| 2012/0319311 | A1 * | 12/2012 | Nutter | F24F 13/00 |
| | | | | 250/437 |
| 2013/0175711 | A1 * | 7/2013 | Nutter | C02F 1/32 |
| | | | | 210/748.11 |
| 2014/0264963 | A1 * | 9/2014 | Barker | F24F 13/00 |
| | | | | 261/37 |
| 2015/0090581 | A1 * | 4/2015 | Saifutdinov | B01D 1/0064 |
| | | | | 202/160 |
| 2016/0356514 | A1 * | 12/2016 | Cai | F24F 13/20 |
| 2017/0023276 | A1 * | 1/2017 | Telian | F24H 9/0031 |
| 2017/0356663 | A1 * | 12/2017 | Couperthwaite | F28F 13/06 |
| 2019/0072289 | A1 * | 3/2019 | Lai | B01F 23/20 |
| 2019/0226697 | A1 * | 7/2019 | Kim | F24F 13/28 |
| 2022/0048794 | A1 * | 2/2022 | Zhang | C02F 1/325 |
| 2022/0120456 | A1 * | 4/2022 | Liu | F24F 6/14 |
| 2022/0128248 | A1 * | 4/2022 | Xu | F24F 6/12 |
| 2023/0129864 | A1 * | 4/2023 | Verhoeven | F24F 6/00 |
| | | | | 422/3 |

FOREIGN PATENT DOCUMENTS

| | | | |
|---|---|---|---|
| CN | 206222587 U | | 6/2017 |
| CN | 206247540 U | | 6/2017 |
| CN | 109386924 | * | 2/2019 |
| CN | 109737539 | * | 5/2019 |
| JP | 3110210 U | | 6/2005 |
| JP | 2013040755 A | | 2/2013 |

* cited by examiner

OVERHEAD TYPE UPPER WATER ADDING HUMIDIFIER

TECHNICAL FIELD

The present invention relates to the technical field of a humidifier, and in particular, to an overhead type upper water adding humidifier.

BACKGROUND

Humidifiers are household appliances that increase room humidity. At present, most of the existing humidifiers adopt upper and lower structures, that is, the upper layer is a water tank and the lower layer is an atomization mechanism. The atomization mechanism atomizes water in the water tank, but the upper and lower layer structure is complex and will waste more space, so that the product with the same volume has smaller water volume, that is, for the humidifiers with the same volume, the humidifier with the upper and lower layer structure has larger volume, and packaging and transportation costs are increased. Furthermore, the water level depth of products cannot be designed randomly, so that the atomization mechanism is not always in the optimal working state, it is necessary to consume more energy, and the maximum atomization efficiency cannot be achieved.

SUMMARY

For the defects in the prior art, the present invention discloses an overhead type upper water adding humidifier, including a water tank and an atomization mechanism, wherein the atomization mechanism includes an atomization cavity, a mounting frame, an atomization sheet and a water level adjusting assembly; the atomization cavity communicates with the water tank through a valve; the mounting frame is arranged in the atomization cavity; the atomization sheet is arranged on the mounting frame; and the water level adjusting assembly is arranged on an inner side wall of the atomization cavity, and the water level adjusting assembly opens or closes the valve according to a depth of the water level in the atomization cavity.

According to an implementation manner of the present invention, the water level adjusting assembly includes a lever floater and a pressing block; the lever floater is rotatably arranged on an inner side wall of the atomization cavity; and the pressing block is arranged on the lever floater.

According to an implementation manner of the present invention, the valve includes a movable rod and a sealing pad; the movable rod penetrates through the atomization cavity, one end of the movable rod being connecting to the pressing block; and the sealing pad sleeves the movable rod and is located in the water tank.

According to an implementation manner of the present invention, the valve further includes an elastic piece; and the elastic piece sleeves the movable rod and is located in the atomization cavity.

According to an implementation manner of the present invention, the atomization mechanism further includes a fan; and the fan is arranged on the mounting frame.

According to an implementation manner of the present invention, the atomization mechanism further includes an air channel; and the air channel is formed in the mounting frame and communicates with an air outlet of the fan.

According to an implementation manner of the present invention, the atomization mechanism further includes a sealing piece; and the sealing piece seals the bottom of the atomization sheet.

According to an implementation manner of the present invention, the overhead type upper water adding humidifier further includes a control mechanism; and the control mechanism is arranged on the mounting frame.

According to an implementation manner of the present invention, the control mechanism includes a control circuit board, a power interface and a switch knob; the control circuit board is arranged on the mounting frame; the power interface is arranged on the mounting frame and is electrically connected to the control circuit board; and the switch knob is arranged on an upper cover and is electrically connected to the control circuit board.

According to an implementation manner of the present invention, the upper cover is provided with an air inlet hole; and the air inlet hole faces towards the air inlet of the fan.

According to an implementation manner of the present invention, the upper cover is provided with an air inlet hole, the air inlet hole communicates with an inner cavity of the upper cover, and the air inlet hole is formed in a side part of the upper cover.

According to an implementation manner of the present invention, the overhead type upper water adding humidifier further includes a lamp assembly, wherein the lamp assembly is arranged on a mounting plate of the mounting frame, and a light-emitting end of the lamp assembly faces towards the atomization cavity.

According to an implementation manner of the present invention, the mounting plate is provided with a lamp holder and the lamp holder is provided with an opening; and the lamp assembly includes a lamp piece and a lamp sleeve, a light-emitting end of the lamp piece is arranged at the opening, and the lamp sleeve is arranged between the light-emitting end of the lamp piece and the opening.

According to an implementation manner of the present invention, the lamp piece is one of an ultraviolet lamp, a lighting lamp and a decorative lamp.

The present invention has the following beneficial effects: according to the overhead type upper water adding humidifier of the present invention, the atomization cavity is nested in the water tank, water in the atomization cavity and the water tank is relatively separated and independent, and the valve is controlled by the water level adjusting assembly to mutually communicate the atomization cavity and the water tank, so that when the humidifier works, a constant water level depth may be maintained above the atomization sheet, the atomization sheet is still in an optimal working state, the maximum atomization efficiency is achieved and waste of energy is avoided; moreover, the atomization cavity is nested in the water tank and space may be fully utilized, so that the water volume of products with the same volume is increased, and the packaging and transportation costs are effectively reduced.

BRIEF DESCRIPTION OF DRAWINGS

The drawings described herein are used to provide a further understanding of the present application and form a part of the present application. The schematic embodiments and descriptions of the present application are used to explain the present application and do not constitute an undue limitation on the present application. In the drawings.

DETAILED DESCRIPTION OF EMBODIMENTS

Many embodiments of the present invention will be disclosed in the following drawings. For the sake of clarity, many practical details will be explained in the following description. However, it should be understood that these practical details should not be used to limit the present invention. That is to say, in some embodiments of the present invention, these practical details are unnecessary. In addition, in order to simplify the drawings, some conventional structures and assemblies will be shown in the drawings in a simple schematic way.

It should be noted that all the directional indications (such as upper, lower, left, right, front, back, etc.) in the embodiments of the present invention are merely used to explain a relative position relationship, motion situations and the like of the components in a specific gesture (as shown in the figures). If the specific gesture changes, the directivity indication also changes accordingly.

Moreover, the terms such as "first", "second" and the like described in the present invention are used herein only for the purpose of description, not for specifically referring to order or sequence and not for limiting the present invention. The terms are only for distinguishing components or operation described in the same technical terms and are not intended to indicate or imply relative importance, or implicitly indicate the number of the indicated technical features. Therefore, features defined by "first" and "second" may explicitly or implicitly include at least one of the features. Furthermore, the technical solutions between the various embodiments may be combined with each other, but must be on the basis that the combination thereof can be implemented by a person of ordinary skill in the art. In case of a contradiction with the combination of the technical solutions or a failure to implement the combination, it should be considered that the combination of the technical solutions does not exist, and is not within the protection scope of the present invention.

To further understand the content, features and effects of the present invention, the following embodiments are exampled and are described in detail with reference to the accompanying drawings.

Embodiment I

Figure 1:
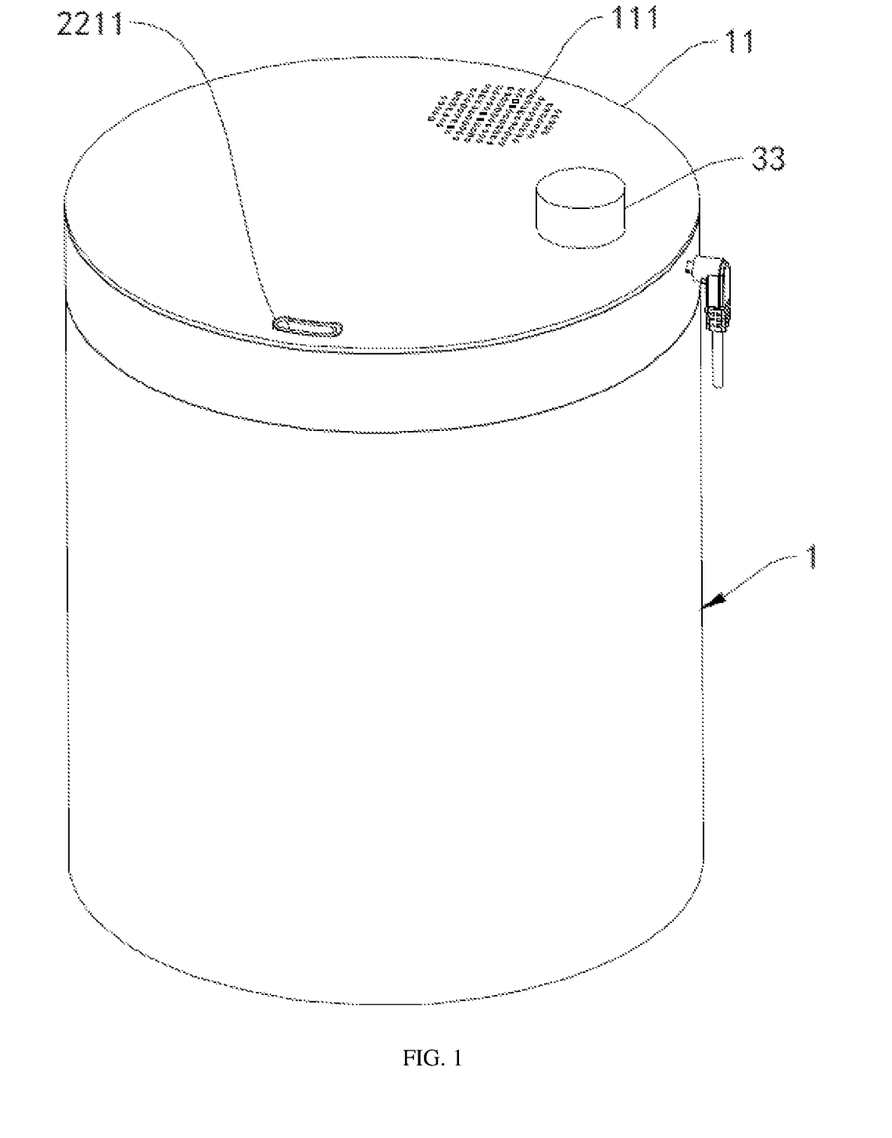
FIG. 1 is a schematic structural diagram of an overhead type upper water adding humidifier according to an embodiment I of the present invention.
Figure 2:
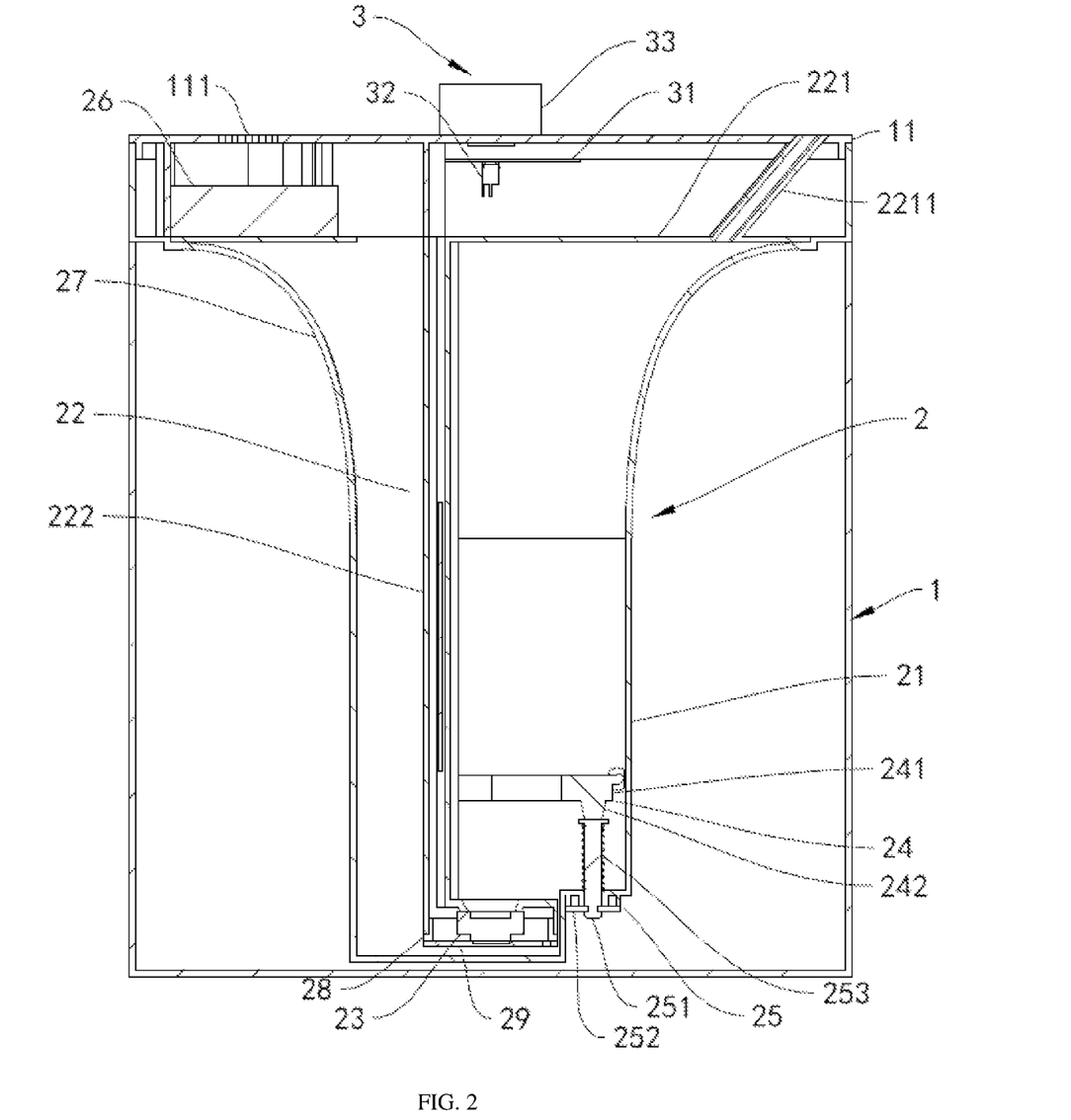
FIG. 2 is a section view of an overhead type upper water adding humidifier according to an embodiment I of the present invention.
Figure 3:
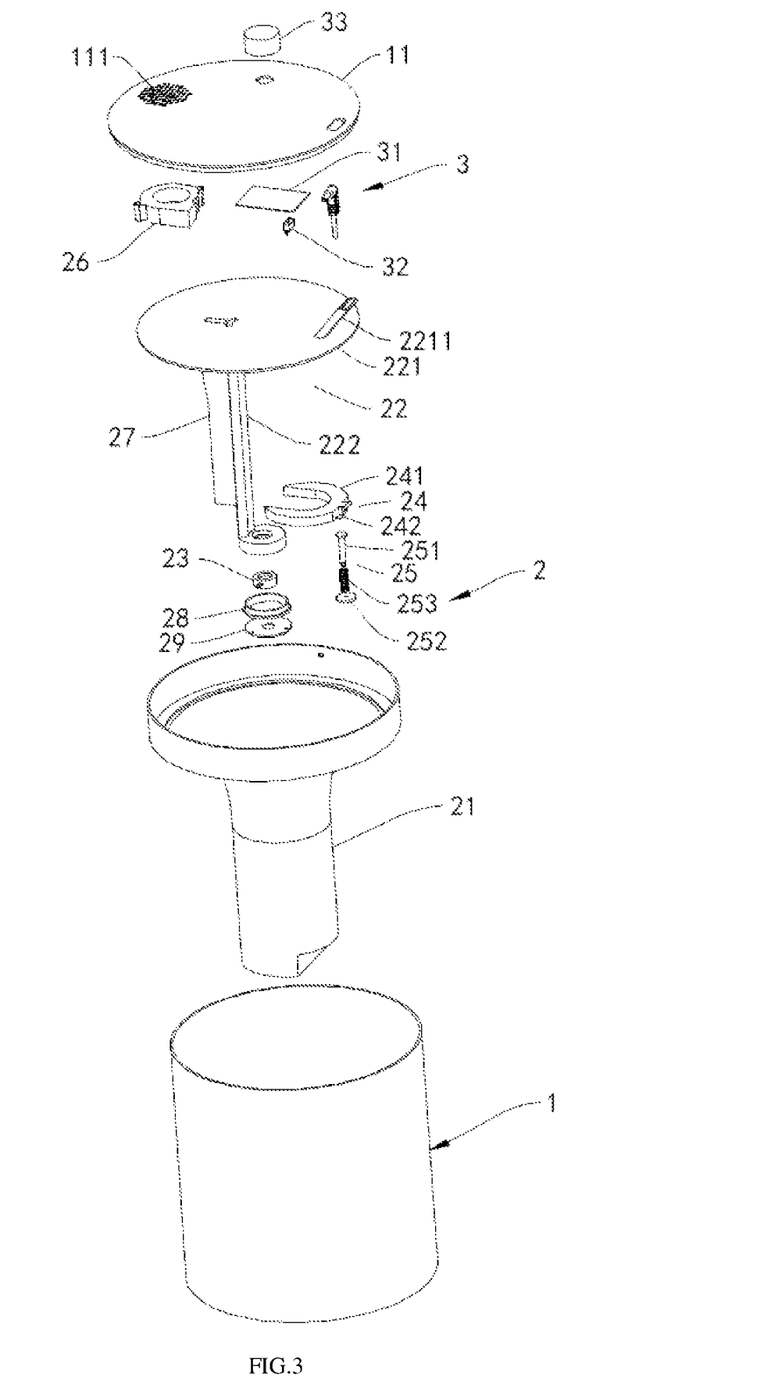
FIG. 3 is a schematic decomposition diagram of an overhead type upper water adding humidifier according to an embodiment I of the present invention.

Referring to FIG. 1, FIG. 2 and FIG. 3, FIG. 1 is a structural schematic diagram of an overhead type upper water adding humidifier according to an embodiment of the present invention; FIG. 2 is a section view of an overhead type upper water adding humidifier according to an embodiment of the present invention; and FIG. 3 is a schematic decomposition diagram of an overhead type upper water adding humidifier according to an embodiment of the present invention. As shown in the figures, the overhead type upper water adding humidifier of the present application includes a water tank 1, an atomization mechanism 2 and a control mechanism 3. The atomization mechanism 2 communicates with the water tank 1. The control mechanism 3 is arranged on the atomization mechanism 2.

Further, the atomization mechanism 2 includes an atomization cavity 21, a mounting frame 22, an atomization sheet 23 and a water level adjusting assembly 24. In the embodiment, the atomization cavity 21 is arranged in the water tank 1, and the atomization cavity 21 communicates with the water tank 1 through the valve 25. Specifically, the valve 25 includes a movable rod 251 and a sealing pad 252. The movable rod 251 runs through the atomization cavity 21, and one end of the movable rod 251 is connected to the water level adjusting assembly 24. The sealing pad 252 sleeves the other end of the movable rod 251, the sealing pad 252 is located in the water tank 1, and the sealing pad 252 is a silica gel pad. The mounting frame 22 is arranged in the atomization cavity 21, and a mounting plate 221 of the mounting frame 22 is clamped at the atomization cavity 21. The atomization sheet 23 is arranged on a crane jib 222 of the mounting frame 22. The water level adjusting assembly 24 is arranged on an inner side wall of the atomization cavity 21, the water level adjusting assembly 24 includes a lever floater 241 and a pressing block 242 which are integrally formed, the lever floater 241 is arranged on the inner side wall of the atomization mechanism through a rotating rod, the pressing block 242 is arranged on the lever floater 241, and the pressing block 242 is connected to one end of the movable rod 251.

The overhead type upper water adding humidifier further includes a control mechanism 3. The control mechanism 3 is arranged on the mounting frame 22. The control mechanism 3 includes a control circuit board 31, a power interface 32 and a switch knob 33. The control circuit board 31 is arranged on the mounting frame 22. The power interface 32 is arranged on the mounting frame 22, and the power interface 32 is electrically connected to the control circuit board 31. The switch knob 33 is arranged on the upper cover 11 of the water tank 1, and the switch knob 33 is electrically connected to the control circuit board 31.

In the embodiment, the control circuit 31 selects a separately excited digital driving circuit, and the separately excited digital driving circuit has the characteristic of low heating and high efficiency; moreover, the control mechanism 3 of the present application is all located above the water tank 1, so that the situation that the control mechanism 3 is damaged by water leakage of the water tank 1 if the control mechanism 3 is arranged below the water tank 1 is avoided, and the service life is prolonged.

It should be noted that the switch knob 33 may function as a switch; meanwhile, rotating the switch knob 33 may adjust the generation speed of water mist, which is convenient for users to make adaptive adjustment according to the situation, thereby facilitating use.

In specific application, a proper amount of water is added into the water tank 1, the atomization mechanism 2 is inserted into the water tank 1, there is no water in the atomization cavity 21 at this time, the lever floater 241 rotates downwards around the rotating rod under the action of gravity, the lever floater 241 drives the pressing block 242 to press the movable rod 251, the movable rod 251 drives the sealing pad 252 to move downwards, a water inlet on the side wall of the atomization cavity 21 is opened, water in the water tank 1 enters the atomization cavity 21 through the water inlet, the water level depth in the atomization cavity 21 gradually increases with continuous entry of water, the lever floater 241 rotates upwards around the rotating rod under the buoyancy action of the water, the lever floater 241 drives the pressing block 242 and the movable rod 251 to move upwards, the movable rod 251 drives the sealing pad 252 to seal the water inlet in the side wall of the atomization cavity 21 again to enable the water in the water tank 1 not to flow into the atomization cavity 21, a power cord is inserted into the power interface 32, the switch knob 33 is rotated to make the machine operate, the atomization sheet 23 makes water in the atomization cavity 21 generate water mist, and the water mist is discharged to the air through a mist outlet 2211 in the mounting plate 221, thereby increasing the room humidity.

Preferably, the valve 25 further includes an elastic piece 253. The elastic piece 253 sleeves the movable rod 251, the elastic piece 253 is located in the atomization cavity 21, the elastic piece 253 is a spring, and one end of the elastic piece 253 abuts against the inner side wall of the atomization cavity 21 and the other end of the elastic piece 253 abuts against one end of the movable rod 251. When the humidifier works, the water level depth in the atomization cavity 21 gradually decreases, the lever floater 241 loses the buoyancy of water, the lever floater 241 rotates downwards around the rotating rod under the action of the own gravity, the lever floater 241 drives the pressing block 242 to press the movable rod 251, the movable rod 251 drives the sealing pad 252 to move downwards, and the water inlet in the side wall of the atomization cavity 21 is opened; at this time, the elastic piece 253 is compressed and water in the water tank 1 flows into the atomization cavity 21; when the water level reaches the optimal water level depth for the atomization sheet 23 to work again, the lever floater 241 floats under the buoyancy action of the water, the movable rod 251 loses the pressure of the pressing block 242, the elastic piece 253 needs to be recovered to an uncompressed state, the elastic piece 253 drives the movable rod 251 to lift, the movable rod 251 drives the sealing pad 252 to lift, and the sealing pad 252 blocks the water inlet of the atomization cavity 21.

Preferably, the atomization mechanism 2 further includes a fan 26 and an air channel 27. The fan 26 is arranged on the mounting plate 221, the air channel 27 is formed in the crane jib 222, and the air inlet of the air channel 27 communicates with the air outlet of the fan 26. In specific application, the upper cover 11 is provided with an air inlet hole 111, the air inlet hole 111 faces towards the air inlet of the fan 26, the external wind sequentially passes through the air inlet hole 111, the air inlet of the fan 26, the air outlet of the fan 26 and the air channel 27 to enter the atomization cavity 21, the wind blows out the water mist generated in the atomization cavity 21 through the mist outlet 2211 and diffusion of the mist to the air may be accelerated, there by rapidly changing the room humidity.

Preferably, the atomization mechanism 2 further includes a sealing piece 28. The sealing piece 28 is sealing silica gel, the sealing piece 28 is mounted on the crane jib 222 through a pressing plate 29, and the sealing piece 28 seals the bottom of the atomization sheet 23, thereby preventing water in the atomization cavity 21 from entering the bottom of the atomization sheet 23 and avoiding damage to a driving circuit at the bottom of the atomization sheet 23.

In conclusion, in one or more embodiments of the present invention, according to the overhead type upper water adding humidifier of the present invention, the atomization cavity is nested in the water tank, water in the atomization cavity and the water tank is relatively separated and independent, and the valve is controlled by the water level adjusting assembly to mutually communicate the atomization cavity and the water tank, so that when the humidifier works, a constant water level depth may be maintained above the atomization sheet, the atomization sheet is still in an optimal working state, the maximum atomization efficiency is achieved and waste of energy is avoided; moreover, the atomization cavity is nested in the water tank and space may be fully utilized, so that the water volume of products with the same volume is increased, and the packaging and transportation costs are effectively reduced.

Embodiment II

Figure 4:
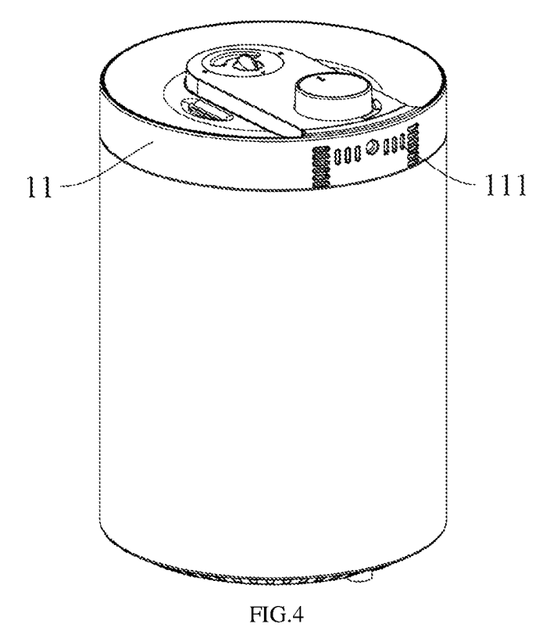
FIG. 4 is a schematic structural diagram of an overhead type upper water adding humidifier according to an embodiment II of the present invention.
Figure 5:
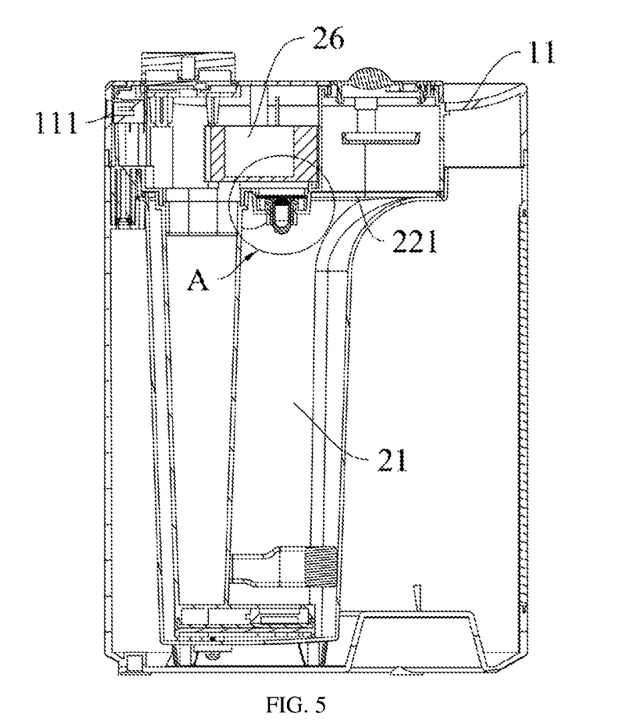
FIG. 5 is a section view of an overhead type upper water adding humidifier according to an embodiment II of the present invention.

Referring to FIG. 4 to FIG. 5, relative to the embodiment I, in this embodiment, the air inlet hole 111 is formed in a side part of the upper cover 11, the air inlet hole 111 communicates with an inner cavity of the upper cover 11, and the air inlet hole 111 communicates with the air inlet of the fan 26 through the inner cavity of the upper cover 11.

Compared with the humidifier with the air inlet hole 111 formed at the bottom of the machine body, the air inlet hole 111 is formed in the side part of the upper cover 11 in this embodiment, so that the mist return phenomenon can be avoided, thus preventing parts at the bottom of the machine body from being damaged by moisture.

Figure 6:
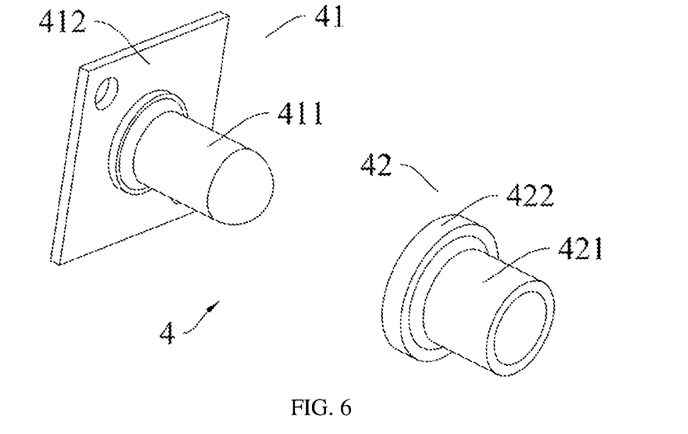
FIG. 6 is a structural decomposition diagram of a lamp assembly according to an embodiment II of the present invention.
Figure 7:
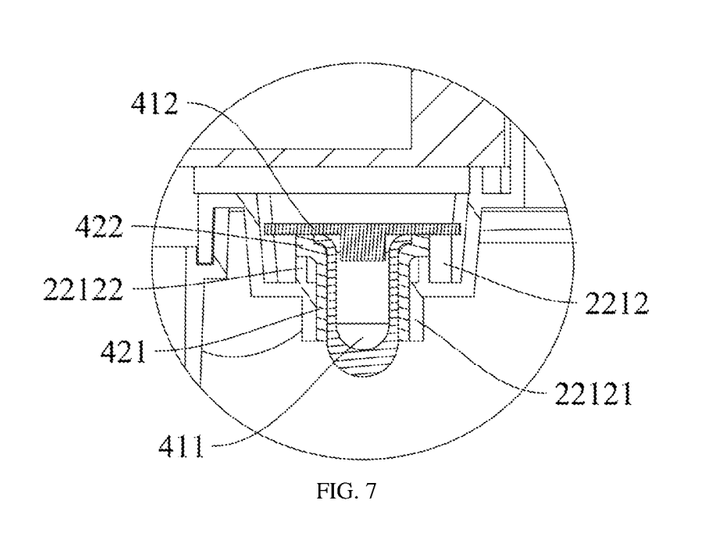
FIG. 7 is an enlarged drawing of an area A in FIG. 5.

Referring to FIG. 5 to FIG. 7, relative to the embodiment I, in this embodiment, a lamp assembly 4 is added, the lamp assembly 4 is arranged on the mounting plate 221, and a light-emitting portion 411 of the lamp assembly 4 faces towards the atomization cavity 21.

The mounting plate 221 is provided with a mounting base 2212 corresponding to the atomization cavity 21, a mounting through hole 22121 and a fence 22122 are arranged at the bottom of the mounting base 2212, the mounting through hole 22121 extends towards the atomization cavity 21, and the fence 22122 is located in the mounting base 2212.

The lamp assembly 4 includes a lamp piece 41 and a lamp sleeve 42, and the lamp sleeve 42 sleeves a light-emitting portion 411 of the lamp piece 41. Specifically, the lamp piece 41 includes a light-emitting portion 411 and a bottom plate 412, and the light-emitting portion 411 is arranged on the bottom plate 412. The lamp sleeve 42 includes a base portion 421 and a pad portion 422, and the pad portion 422 is arranged at one end of the base portion 421. The base portion 421 is cylindrical and the pad portion 422 is ring-shaped; and when the base portion 421 sleeves the light-emitting portion 411, one side of the pad portion 422 abuts against the bottom plate 412. In the embodiment, the lamp piece 41 may be one of an ultraviolet lamp, a lighting lamp and a decorative lamp.

The assembled lamp assembly 4 is fixed in the mounting base 2212, and the light-emitting portion 411 passes through the mounting through hole 22121. At this time, the base portion 421 is located between the light-emitting portion 411 and the mounting through hole 22121 to seal a gap between the light-emitting portion 411 and the mounting through hole 22121; and the pad portion 422 abuts against the fence 22122 and seals the fence 22122, thereby realizing double sealing and preventing water mist from entering the inner cavity of the upper cover 11 through the mounting through hole 22121.

In the embodiment, a lamp assembly 4 is provided, and the lamp assembly 4 is arranged on the upper cover 11 and light generated by the lamp assembly 4 is directed to the atomization cavity 21, so that lamp light is softer and more uniform and is not affected by the water.

The above is an implementation manner of the present invention and is not intended to limit the present invention. Various changes and modifications may be made to the present invention by those skilled in the art. Any modifications, equivalent substitutions, improvements, etc. made within the spirit and principle of the present invention should be included within the scope of the claims of the present invention.

What is claimed is:

1. An overhead type upper water adding humidifier, comprising a water tank and an atomization mechanism, wherein the atomization mechanism comprises an atomization cavity, a mounting frame, an atomization sheet and a water level adjusting assembly; the atomization cavity communicates with the water tank through a valve; the mounting frame is arranged in the atomization cavity; the atomization sheet is arranged on the mounting frame; and the water level adjusting assembly is arranged on an inner side wall of the atomization cavity, and the water level adjusting assembly opens or closes the valve according to a depth of the water level in the atomization cavity;

wherein the mounting frame comprises:

a mounting plate, arranged in the atomization cavity, and the mounting plate being provided with a mist outlet thereon; and a crane jib, fixedly connected to the mounting plate and arranged extending from the mounting plate downwards in the atomization cavity; and the atomization sheet being arranged on an end of the crane jib facing away from the mounting plate;

wherein the water level adjusting assembly comprises a lever floater and a pressing block; the lever floater is rotatably arranged on an inner side wall of the atomization cavity and rotatable downwards and upwards to open and close the valve respectively; and the pressing block is arranged on a side of the lever floater close to the valve; and wherein the crane jib passes through the lever floater to connect the atomization sheet and thereby the lever floater is arranged between the mounting plate and the atomization sheet and surrounding the crane jib.

2. The overhead type upper water adding humidifier according to claim 1, wherein the valve comprises a movable rod and a sealing pad; the movable rod penetrates through the atomization cavity, one end of the movable rod being connecting to the pressing block; and the sealing pad sleeves the movable rod and is located in the water tank;

wherein when the lever floater rotates upwards under a buoyancy action of water to close the valve, the lever floater drives the pressing block and the movable rod to move upwards, the movable rod drives the sealing pad to seal an water inlet of the atomization cavity to enable water in the water tank not to flow into the atomization cavity, an end of the atomization sheet facing away from the crane jib is farther away from the mounting plate than a free end of the movable rod facing away from the pressing block.

3. The overhead type upper water adding humidifier according to claim 2, wherein the valve further comprises an elastic piece; and the elastic piece sleeves the movable rod and is located in the atomization cavity.

4. The overhead type upper water adding humidifier according to claim 1, wherein the atomization mechanism further comprises a fan; and the fan is arranged on the mounting plate of the mounting frame.

5. The overhead type upper water adding humidifier according to claim 4, wherein the atomization mechanism further comprises an air channel; and the air channel is formed in the crane jib of the mounting frame and communicates with an air outlet of the fan.

6. The overhead type upper water adding humidifier according to claim 1, wherein the atomization mechanism further comprises a sealing piece; and the sealing piece is mounted on the crane jib through a pressing plate to seal a bottom of the atomization sheet.

7. The overhead type upper water adding humidifier according to claim 1, further comprising a control mechanism, wherein the control mechanism is arranged on the mounting frame.

8. The overhead type upper water adding humidifier according to claim 7, wherein the control mechanism comprises a control circuit board, a power interface and a switch knob; the control circuit board is arranged on the mounting frame; the power interface is arranged on the mounting frame and is electrically connected to the control circuit board; and the switch knob is arranged on an upper cover disposed on the mounting frame and is electrically connected to the control circuit board.

9. The overhead type upper water adding humidifier according to claim 8, wherein the upper cover is provided with an air inlet hole; and the air inlet hole faces towards an air inlet of a fan.

10. The overhead type upper water adding humidifier according to claim 8, wherein the upper cover is provided with an air inlet hole, the air inlet hole communicates with an inner cavity of the upper cover, and the air inlet hole is located on a side part of the upper cover.

11. The overhead type upper water adding humidifier according to claim 1, further comprising a lamp assembly, wherein the lamp assembly is arranged on the mounting plate of the mounting frame, and a light-emitting portion of the lamp assembly faces towards the atomization cavity.

12. The overhead type upper water adding humidifier according to claim 11, wherein the mounting plate is provided with a mounting base and the mounting base is provided with a mounting through hole; and the lamp assembly comprises a lamp piece and a lamp sleeve, the light-emitting portion of the lamp piece is arranged in the mounting through hole, and a base portion of the lamp sleeve is arranged between the light-emitting portion and the mounting through hole.

13. The overhead type upper water adding humidifier according to claim 12, wherein the lamp piece is one of an ultraviolet lamp, a lighting lamp and a decorative lamp.

14. The overhead type upper water adding humidifier according to claim 1, wherein the atomization cavity comprises an upper cavity and a lower cavity divided by the mounting plate, the upper cavity is located above the water tank, and the lower cavity downwardly extends in the water tank;

wherein the mist outlet is located in the upper cavity, and the crane jib is arranged in the lower cavity and located at a side of the mounting plate facing away from the upper cavity; and wherein the overhead type upper water adding humidifier further comprises an upper cover, the upper cover is arranged covering the upper cavity and exposes the mist outlet.

15. The overhead type upper water adding humidifier according to claim 14, wherein the atomization mechanism comprises a fan and an air channel, the fan is arranged in the upper cavity, the air channel is formed in the crane jib, the upper cover is provided with an air inlet hole communicated with the upper cavity, an air inlet of the air channel communicates with an air outlet of the fan and thereby external wind is capable of sequentially passing through the air inlet hole, the fan and the air channel to enter the lower cavity of the atomization cavity.

16. The overhead type upper water adding humidifier according to claim 14, further comprising: a control mechanism and a fan, wherein the control mechanism and the fan each are arranged on a side of the mounting plate facing away from the water tank.

17. A humidifier, comprising:
a water tank;
an atomization mechanism, comprising:
an atomization chamber, disposed in the water tank and communicated with the water tank through a valve, wherein the valve comprises a movable rod;
a mounting frame, comprising an elongated crane jib arranged extending downwards in the atomization chamber;
an atomization sheet, arranged on a lower end of the crane jib and in the atomization chamber; and
a water level adjusting assembly, configured to open or close the valve according to a depth of a water level in the atomization chamber, and the water level adjusting assembly comprising a lever floater rotatably arranged on an inner side wall of the atomization chamber and a pressing block connected to a side of the lever floater facing towards the valve and connected to the movable rod;
wherein the lever floater is configured to rotate downwards under an action of gravity to open the valve and thereby the movable rod moves downwards and water in the water tank enters the atomization chamber through a water inlet of the atomization chamber, and is configured to rotate upwards under a buoyancy action of water to close the valve and thereby the movable rod moves upwards, the water inlet of the atomization chamber is sealed and water in the water tank does not flow into the atomization chamber;
wherein the crane jib passes through the lever floater to connect the atomization sheet and whereby the lever floater is arranged surrounding the crane jib.

18. The humidifier according to claim 17, wherein the mounting frame further comprises: a mounting plate, arranged in the atomization chamber and connected to the crane jib; and
wherein when the lever floater of the water level adjusting assembly rotates upwards under the buoyancy action of water to close the valve, an end of the atomization sheet facing away from the crane jib is farther away from the mounting plate than a lower end of the movable rod facing away from the pressing block.

19. The humidifier according to claim 17, wherein the mounting frame further comprises: a mounting plate, arranged in the atomization chamber and connected to the crane jib;
wherein a side of the atomization chamber facing away from the mounting plate is provided with a bottom surface and a stepped surface, the stepped surface is closer to the mounting plate than the bottom surface, and the atomization sheet is disposed just above the bottom surface;
wherein the movable rod penetrates through the stepped surface, and a lower end of the movable rod is a free end and located in the water tank; and
wherein a side of the atomization sheet close to the bottom surface is closer to the bottom surface than the free end of the movable rod when the valve is closed.

20. The humidifier according to claim 17, wherein the mounting frame further comprises: a mounting plate, arranged in the atomization chamber and connected to the crane jib; and
wherein the lower end of the crane jib facing away from the mounting plate is provided with a protrusion, the protrusion is located between the lever floater and the atomization sheet, a side of the protrusion facing away from the lever floater is in contact with the atomization sheet, and the protrusion is provided with an opening corresponding to the atomization sheet.

\* \* \* \* \*